Oct. 14, 1952   J. J. DIGBY   2,613,539
ENGINE STARTER DRIVE
Filed March 27, 1950

WITNESS:
Esther M. Stockton

INVENTOR.
James J. Digby
BY
Clinton S. Janes
ATTORNEY

Patented Oct. 14, 1952

2,613,539

UNITED STATES PATENT OFFICE 2,613,539

ENGINE STARTER DRIVE

James J. Digby, Elmira, N. Y., assignor to Bendix Aviation Corporation, a corporation of Delaware Application March 27, 1950, Serial No. 152,100

4 Claims. (Cl. 74—7)

The present invention relates to engine starter gearing, and more particularly to a so-called "anti-kickout" drive which engages the engine gear automatically upon energization of the starting motor, and maintains such engagement as long as the motor remains energized.

It is an object of the present invention to provide a novel starter drive of the above type which is efficient and reliable in operation, small in size, and economical to manufacture.

It is another object to provide such a device which overruns freely without undue generation of heat when the engine starts, but which reengages promptly and resumes cranking without shock in case the engine fails to remain self-operative.

Figure 1:
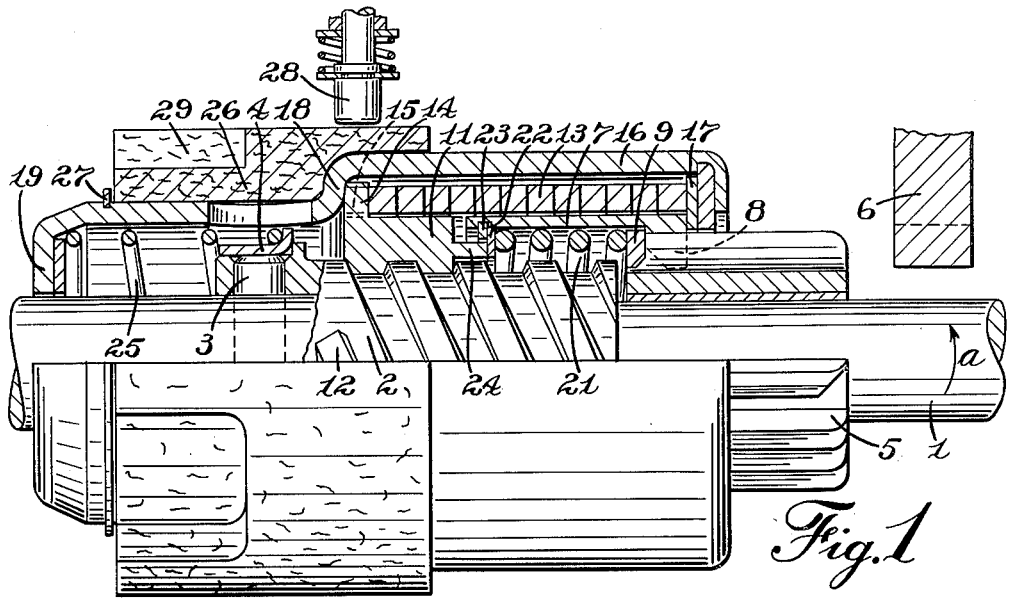
Figure 2:
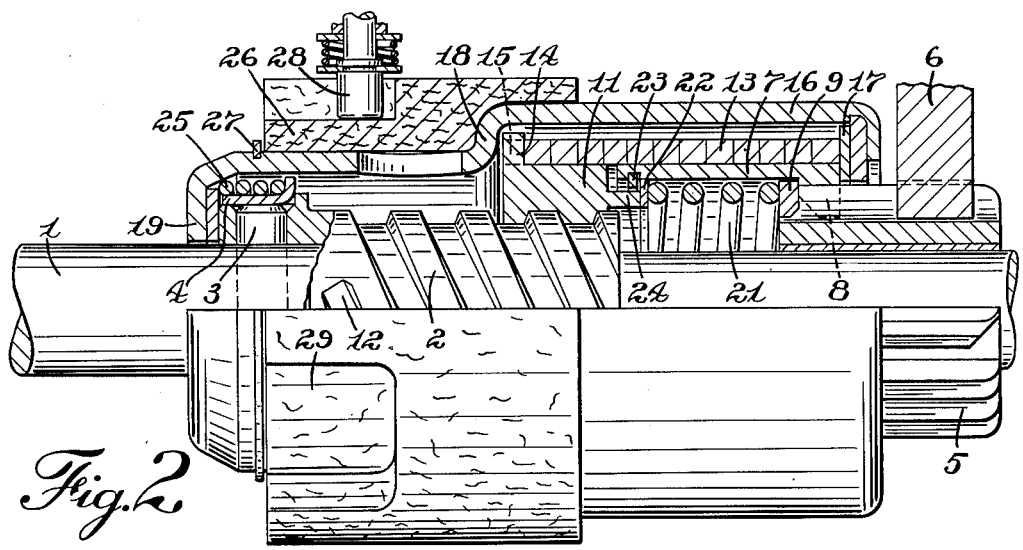

Further objects and advantages will be apparent from the following description taken in connection with the accompanying drawing in which:

Fig. 1 is a side elevation partly broken away and in section showing the parts in idle position; and Fig. 2 is a similar view showing the parts in the positions assumed during cranking of the engine.

In Fig. 1 of the drawing there is illustrated a power shaft 1 on which a screw shaft 2 is fixedly mounted as by means of a cross pin 3 which is retained by a flanged thimble 4. A pinion 5 is slidably journaled on the power shaft 1 for longitudinal movement into and out of mesh with a gear 6 of the engine to be started.

A sleeve 7 having a smooth cylindrical exterior surface is splined on the pinion as indicated at 8, being retained thereon by a ring member 9 fixedly mounted on the end of the pinion in any suitable manner. A control nut 11 is threaded on the screw shaft 2, normally resting against the ends 12 of the threads thereof, and means forming an overrunning clutch connection from the nut 11 to the sleeve 7 is provided in the form of a coiled spring 13 anchored at one end to a flange 14 of the control nut as indicated at 15, and conforming closely to the exterior surface of the sleeve 7. The convolutions of spring 13 are preferably substantially rectangular in cross-section as illustrated, and the spring is wound in such a direction that when cranking torque is transmitted from the control nut 11 through the spring to the sleeve 7, the spring wraps down and grips the sleeve so as to form a torque-transmitting connection. When the sleeve overruns the nut 11 however, the spring 13 unwraps, releasing the sleeve so as to permit it to overrun freely.

A barrel member 16 surrounds the control nut, sleeve and spring, and has an abutment ring 17 fixed in one end thereof which forms a thrust bearing for the end of the sleeve 7. Barrel 16 is provided intermediate its length with a shoulder 18 against which the flange 14 of the control nut 11 is normally seated. The barrel 16 is also provided with an inwardly extending terminal flange 19 which is adapted to engage the end of the screw shaft 2 so as to limit the travel of the barrel and its associated parts when the drive is in cranking position as illustrated in Fig. 2.

Means for resisting telescoping movement of the pinion 5 into the sleeve 7 is provided in the form of a compression spring 21 within the sleeve, bearing at one end against the ring 9 of the pinion, and at its other end against a thrust washer 22 which is retained in the end of the sleeve 7 by a lock ring 23. The nut 11 is provided with an extension 24 bearing against the thrust ring 22 so as to maintain the sleeve 7 in engagement with the abutment ring 17 of the barrel. An anti-drift spring 25 seated at one end on the thimble 4, and at its other end bearing against the flange 19 of the barrel normally retains the parts in idle position as shown in Fig. 1.

A detent ring 26 of fiber or other suitable material is swiveled on the barrel 16 against the shoulder 18 thereof, being retained by a lock ring 27. A detent plunger 28 is arranged to be projected into one of the pockets 29 of the ring 26 upon closure of the starting switch, not illustrated, in order to maintain the drive pinion 5 in engagement with the engine gear 6 as long as the starting switch is closed, in the manner shown and described in the patent to Oliver, 2,444,109, June 29, 1948.

In operation, starting with the parts in the positions illustrated in Fig. 1, rotation of the power shaft in the direction of the arrow (a) causes the control nut 11 to be traversed to the right, which longitudinal movement is transmitted through the thrust ring 22 and spring 21 to the pinion 5, causing it to move into mesh with the engine gear 6. The barrel 16 is also moved longitudinally by reason of the thrust connection between the sleeve 7 and the abutment 17, until the flange 19 of the barrel is arrested by engagement with the end of the screw shaft 2. Thereupon further movement of the control nut 11 compresses the spring 13 against the abutment 17 in the barrel, and applies torque to the spring causing it to wrap down and grip the sleeve 7. The pressure of the end convolution of the spring 13 against the abutment 17 resists the rotation of that end of the spring so as to initiate and insure the wrap-down action of the spring. The cranking torque is thereafter transmitted by the spring 13 to the sleeve 7 and pinion 5 to rotate the engine gear 6.

When the engine starts, the acceleration of the pinion 5 causes it to overrun the starting motor, whereupon the spring 13 unwraps and permits the pinion 5 and sleeve 7 to rotate freely. During this time, the detent plunger 28 is in engagement with the ring 26 as shown in Fig. 2 so that if the engine should not remain self-operative, the cranking operation will be immediately resumed as soon as the pinion ceases to overrun the starting motor. When a successful start is secured and the starting switch is opened and the plunger 28 withdrawn, the parts are returned to idle position by the overrunning action of the pinion assisted by the anti-drift spring 25. If during the meshing movement of the drive, a tooth of the pinion 5 should abut against a tooth of the engine gear 6, the pinion 5 is permitted to telescope into the sleeve 7, compressing the mesh-enforcing spring 21 until sufficient torque is built up to index the pinion tooth into registry with the tooth spaces of the engine gear, whereupon the spring 21 expands and snaps the pinion into initial meshing relation to the engine gear, whereupon the meshing and cranking operations proceed as usual.

Although but one embodiment of the invention has been shown and described in detail, it will be understood that other embodiments are possible and that changes may be made in the design and arrangement of the parts without departing from the spirit of the invention.

I claim:

1. In an engine starter drive a power shaft, a screw shaft fixed thereon, a nut threaded on the screw shaft, a pinion slidably journaled on the power shaft for longitudinal movement into and out of mesh with a gear on the engine to be started, means for actuating the pinion from the nut including a sleeve splined to the pinion having a smooth cylindrical peripheral surface, and a coiled spring member bearing on said surface, anchored at one end to the nut and arranged to wrap down and grip the sleeve by transmission of cranking torque therethrough; and means for limiting the longitudinal travel of the nut; in which the means for limiting the meshing movement of the pinion includes a barrel member enclosing the nut, sleeve and torque-transmitting spring, and having an abutment for the sleeve at one end, and a flange at the other end which engages the end of the screw shaft when the pinion is in mesh with the engine gear.

2. An engine starter drive as set forth in claim 1 in which the torque-transmitting spring is close-wound, and serves as a thrust connection between the nut and the abutment in the barrel.

3. An engine starter drive as set forth in claim 1, including further means for holding the pinion in mesh with the engine gear.

4. An engine starter drive as set forth in claim 1 including further means including a detent ring swiveled on the barrel and a plunger engageable therewith to hold the pinion in mesh with the engine gear as long as the power shaft is energized.

JAMES J. DIGBY.

No references cited.